Sept. 6, 1960  J. A. HINDS  2,951,541
ROOT RETENTION STRUCTURE FOR MOLDED ROTOR BLADES
Filed May 27, 1957
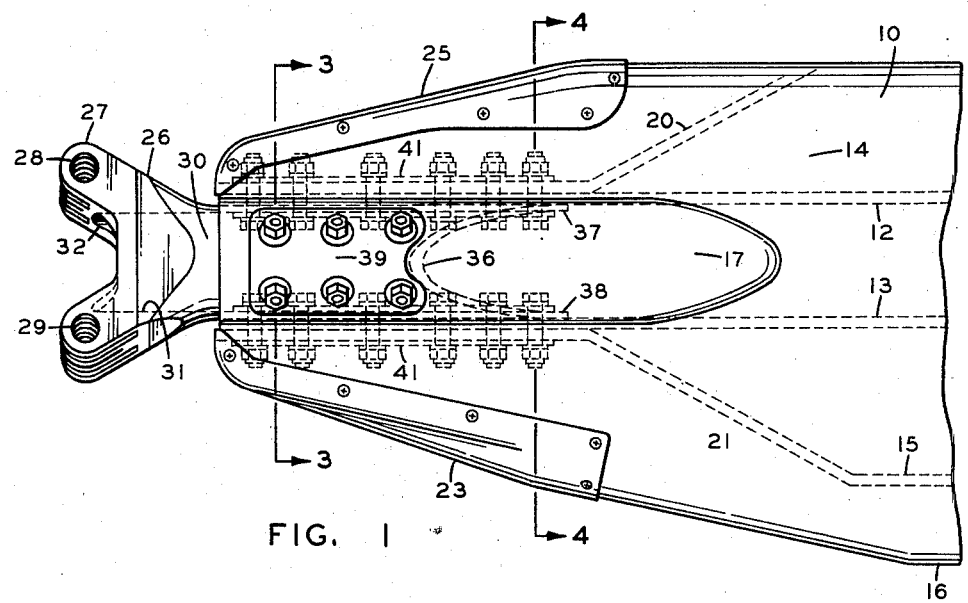
FIG. 1
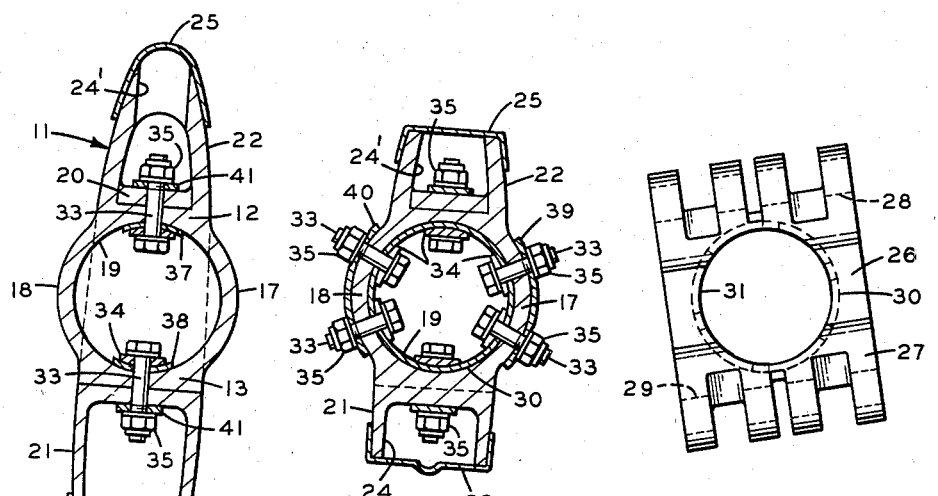
FIG. 3
FIG. 4
FIG. 2
INVENTOR.
JAMES A. HINDS
BY
ATTORNEY United States Patent Office 2,951,541
Patented Sept. 6, 1960

2,951,541

ROOT RETENTION STRUCTURE FOR MOLDED ROTOR BLADES

James A. Hinds, Traverse City, Mich., assignor to Parsons Corporation, Detroit, Mich., a corporation of Michigan Filed May 27, 1957, Ser. No. 661,877

10 Claims. (Cl. 170—159)

This invention relates to airfoil retention means and more particularly to novel root retention structure especially designed and suited for molded plastic rotor blades.

It is a primary object of the present invention to provide improved root retention means for rotor blades of molded plastic construction, particularly adapted to meet the problems of load transfer between such retention means and the molded blade shell.

A further object is to provide for easy access for securing the retention means to the blade.

Still another object is to provide retention means wherein the root of the blade is clampingly held for load transfer, thereby avoiding delamination of the plastic material.

An additional object is to provide blade retention means engaging enlarged surfaces of the blade at the root end for adequate transfer of all loads, including centrifugal forces and edgewise and flapwise bending.

These objects, and others which will be apparent from this specification, are accomplished by the structure illustrated in the drawing, in which:

Figure 1 is a plan view of the root end of a molded plastic rotor blade having root retention structure embodying the present invention;

Figure 2 is an end view of the root retention fitting of Figure 1;

Figure 3 is a sectional view taken along line 3—3 of Figure 1; and

Figure 4 is a sectional view taken along line 4—4 of Figure 1, the dashed lines showing the airfoil contour outboard of the root end cylindrical enlargement.

A rotor blade whose root end utilizes the retention structure of the present construction may be molded in a variety of ways. One suitable blade construction involves the use of a pre-molded spar molded into a spanwise-reinforced plastic skin. Such a rotor blade structure is generally designated 10 and preferably includes as its principal load-carrying element a molded plastic combined leading edge and spar generally designated 11 having substantially vertical, integral spanwise-extending forward and aft spar reinforcement walls 12, 13. The blade structure also includes a molded plastic skin 14 having a spanwise-extending aft structure reinforcement 15 between the spar 11 and a trailing edge 16.

At the root end of such a molded plastic blade, the forward and aft spar reinforcement walls 12, 13 which face each other are rounded concavely and the upper and lower airfoil surfaces are bulged locally from the contour shown in the dashed lines of Figure 4, their areas being referred to as the outward bulging upper and lower cylindrical wall portions 17, 18. In this manner there is provided inside the airfoil a cylindrical root retention cavity 19, as shown in Figures 3 and 4. The diameter of the cavity 19 is preferably greater than that necessary to receive a man's fist, for reasons which will be apparent.

In order to carry loads from the leading edge portion of the spar 11 to the walls of the root retention cavity 19 and from the aft structure reinforcement 15 to the aft side of the cavity 19, I provide forward and aft molded diagonal reinforcements 20, 21 respectively, which in the area of the cavity 19 extend straight spanwise along the forward and aft sides respectively of the spar reinforcement walls 12, 13, but thence diagonally outward. These diagonal reinforcements 20, 21 are secured to the areas which they contact by a resin similar to the resin used in molding the structure which has been described. The aft diagonal reinforcement 21 is preferably channel-shaped as shown in Figures 3 and 4, with the flanges extending aft and its web portion resin-bonded to the aft side of the spar to be substantially integral therewith. Its channel shape provides an aft access opening 24, which is open save for the use of a removable root trailing edge cover 23.

The spar includes a fairly thick leading edge portion 22 curved to the leading edge airfoil contour, within which is a hollow provided by molding over a spanwise core. Cutting off the leading edge portion 22 diagonally toward the root end provides a forward access opening 24' which may be covered by a front access door 25. Hence, access openings are provided both forward and aft of the cylindrical root retention cavity 19.

Within the cavity 19, I fit a steel retention member generally designated 26 as illustrated in Figure 1. At its root (or spanwise-inner) end it includes a blade-mounting provision such as the double clevis-type mounting 27 having bores 28, 29 for bolting the blade structure to the hub of the helicopter. The steel retention fitting 26 also includes a hollow cylindrical stub spar portion 30 whose outer diameter fits closely within the inner diameter of the retention cavity 19. Intermediate the double clevis mounting 27 is a cylindrical bore 31 coextensive in diameter with and leading into the inner diameter of the stub spar portion 30, accessible through a circular inner end opening 32 between the bolt apertures 28, 29.

The size of the opening 32 and the cylindrical bore 31 which connects to the interior of the stub spar 30 is preferably constant and large enough to permit the entry of a man's hand curled into a fist. Any size may be chosen which is sufficient to permit attachment, removal and manipulation of a plurality of clamping bolts 33 which are installed with the heads within the cavity 19 bearing against drilled metal strips 34 whose outer surfaces are convex and fit against and conform to the concave inner cylindrical wall of the stub spar portion 30. The bolts 33 extend perpendicularly through the wall of the stub spar portion 30 as shown, and through adjacent portions of the plastic blade structure. Some of the bolts extend directly forward through the forward spar reinforcement wall 12 and through the portion of the forward reinforcement 20 thereadjacent into the forward access opening 24; others, aligned with them, extend directly aft through the aft spar reinforcement wall 13 and the rear reinforcement 21. Such of the bolts 33 which extend forward and aft, as described, are secured by nuts 35 affixed readily through the access openings 24, 24'.

As shown in Figure 1, the stub spar portion 30 has cutouts 36 in its upper and lower surfaces at their spanwise outer end. The said cutouts 36 are preferably of the "fish-mouth" type, that is, deeply scalloped and leaving two jaw-like projecting end portions, one referred to as a forward jaw 37 and the other a rear jaw 38, presented against the inner surfaces of the cavity 19 adjacent the forward and aft spar reinforcement walls 12, 13 respectively and secured by the bolts 33 thereto, as is shown in Figures 1 and 4. The stiffness of the spanwise outer end of the cylindrical stub spar portion 30 is relieved by the fish-mouth cutouts 36, to provide for a more gradual load transfer from the relatively low-modulus plastic material to the high-modulus steel.

Some clamping bolts 33 inward of the fish-mouth cutouts 36 penetrate the wall of the tubular stub spar portion 30 outwardly above and below, at convenient angles as shown in Figure 3. Such bolts 33 pass through the outward bulging cylindrical portions 17, 18 of the molded root end enlargement of the spar, and through bolt-bearing apertures in upper and lower outer metal clamp plates 39, 40. Figure 1 shows the spanwise and chordwise extent of the upper clamp plate 39; and the lower clamp plate 40 is similar. These bolts are secured by nuts 35 external of the airfoil.

Within the access openings 24, 24′ elongated internal metal clamp plates 41 are provided. These are drilled to provide bearing apertures for the bolts which extend forward and aft into the access openings 24, 24′. These serve to effect load transfer in the same manner as the upper and lower clamp plates 39, 40.

To avoid delamination it is important that the load transmission between the plastic blade material and the cylindrical stub spar portion be not merely by bearing of the bolts. Material whose density is as low as that of molded fiberglass plastic and polyester resin does not have the high strength in bearing as would be necessary to load up the bolts 35 to anywhere near their capacity. However, with the plastic material clamped between the outer wall surface of the stub spar portion 30 and the inner surfaces of the upper and lower clamp plates 39, 40 and the forward and aft internal clamp plates 41, bending loads which are carried by the compression or elongation of the plastic material adjacent the retention cavity 19, are picked up over a broad surface area and transmitted by the clamping action to the root retention fitting, without danger of delamination or other damage to the plastic.

One of the principal advantages of the use of a stub spar in an enlarged molded retention cavity is that all the bolts 33 are accessible and within easy reach through the opening 32 to the inside of the cylindrical stub spar portion 30. Mounting the blade structure to the retention fitting is thus greatly simplified. The metal parts can be readily checked for incipient fatigue failure, and are easily and inexpensively replaced.

Various modifications, both in details of design and in the materials utilized, will occur to those skilled in the art. Accordingly this invention is not to be construed narrowly, but as fully coextensive with the claims hereof.

I claim:

1. The combination comprising a fiberglass and plastic rotor blade provided with an open-end spanwise-extending cylindrical retention cavity in the root end of said blade and with a pair of open-end access cavities chordwise adjacent and flanking said retention cavity, a retention member having a hollow cylindrical portion secured within said retention cavity and having a mounting portion extending externally of the retention cavity and including an end opening of such area as to permit access to the inside of said hollow cylindrical portion, together with a plurality of securing means within said cylindrical portion accessible for securement from the end opening and extending outwardly from said portion through the walls thereof and through the walls of said cylindrical retention cavity, some of said securing means extending to the outside of said blade and others of said securing means extending into said access cavities.

2. The combination comprising an airfoil provided with an open-end retention cavity molded in the root end of the airfoil and with an access cavity adjacent the retention cavity, a spanwise wall within said airfoil common to and separating said cavities, a hollow tubular member having a spanwise-outer portion fitted within said retention cavity and having a spanwise-inner portion including mounting means adjacent the root end of the airfoil and an opening communicating with the spanwise-outer portion, together with securing bolts accessible for securement through said opening and extending substantially perpendicularly outward through the wall of the spanwise-outer portion of said tubular member and through adjacent portions of the molded retention cavity, some of said securing bolts penetrating the outer surface of the airfoil and others penetrating the spanwise wall and extending into said access cavity.

3. The combination comprising a rotor blade provided with an open-end spanwise-extending cylindrical retention cavity in the root of such blade and with a pair of open-end access cavities flanking said retention cavity in chordwise-adjacent relationship and separated therefrom by molded internal spanwise walls, a retention member having a hollow cylindrical portion extending within said retention cavity and having a mounting portion external of said cylindrical cavity, said mounting portion including an end opening whereby access is provided to the inside of said hollow cylindrical portion, and a plurality of bolts extending radially through the wall of the hollow cylindrical portion and into and through adjacent portions of the retention cavity, some of said bolts passing through said internal walls and being accessible for securement through said access cavities.

4. Airfoil structure comprising a spanwise-extending airfoil element provided with an open-end cylindrical retention cavity molded in and extending spanwise a distance from the root end of the airfoil element, the upper and lower surfaces of the root end of the airfoil element being roundably enlarged in the region of said cavity to provide rounded wall portions therefor, and a hollow tubular member having a spanwise-outer cylindrical portion fitted within said cavity, a spanwise-inner portion including a blade-mounting provision and an end opening whereby access is provided to the inside of the spanwise-outer portion, together with securing means engaging the roundedly enlarged upper and lower portions to the said spanwise-outer portion of the hollow member.

5. A rotor blade comprising a spanwise-extending hollow airfoil element too small inside to accommodate a man's fist, said airfoil element having a locally-enlarged root end portion provided with a spanwise cylindrical retention cavity and access cavities chordwise-adjacent thereto, in combination with a retention member having fitted within said retention cavity a hollow cylindrical portion whose inner diameter is sufficient to accommodate a man's fist and having outside said cavity a blade-mounting provision and an end opening at least as large as and communicating with the interior of said hollow cylindrical portion, and a plurality of bolts extending radially through the wall of said hollow cylindrical portion and into and through adjacent portions of said airfoil element.

6. Airfoil structure and retention means comprising a spar formed of a material whose density is less than steel and provided with an open-end retention cavity molded in the root end thereof, a hollow tubular steel retention member having a portion fitted in said retention cavity, a plurality of securing bolts extending substantially perpendicularly outward through the wall of the portion of the retention member fitted within the retention cavity, some of said bolts extending through the upper and lower portions of the spar, external metal clamp plates on said upper and lower spar portions having bearing apertures penetrated by said securing bolts, and nuts cooperating with said bolts to clamp the spar between the steel retention member and the metal clamp plates, whereby to transfer loads between said spar and said retention member at least partially by surface bearing between the members so clamped.

7. Rotor blade structure and retention means comprising a spanwise-extending fiberglass airfoil element having a root end portion including upper and lower rounded enlargements defining upper and lower outer wall portions of an integral hollow cylindrical retention cavity in the root of said element, upper and lower external clamp plates rounded to fit against the upper and lower outer wall portions so defined, said hollow cylindrical cavity having an inner wall, a steel retention fitting including a hollow cylindrical stub spar portion fitted within said inner wall of the retention cavity, and a plurality of bolts each extending and secured perpendicularly through the wall of said hollow steel stub spar portion, the wall of said retention cavity, and one of said clamp plates.

8. Rotor blade structure and retention means comprising a spanwise-extending airfoil element having a root end portion provided with a cylindrical retention cavity and access openings chordwise forward and aft thereof, a hollow cylindrical metal stub spar fitted within said retention cavity and having at its spanwise-outer end cutouts in the upper and lower surfaces thereof leaving jaw-like end portions projecting spanwise-outwardly on the chordwise forward and aft sides of said cylindrical stub spar, and a plurality of bolts retaining the stub spar within the cavity, some of said bolts extending through the jaw-like projecting end portions into and through adjacent material of the molded airfoil element and retained within said access openings.

9. The combination of an airfoil provided with a spanwise-extending retention cavity in an end of the airfoil and a pair of access cavities in said airfoil end, one said access cavity being chordwise forward and the other being chordwise aft of said retention cavity, and separated therefrom by spanwise walls within the airfoil, in combination with a retention member having an airfoil-attachment portion fitted within said retention cavity and a mounting portion external of said cavity, first securing means extending forward and aft through said spanwise walls by which the airfoil attachment portion of the retention member is secured in relation to said access cavities, and second securing means extending upward and downward through the airfoil end by which said airfoil-attachment portion of the retention member is secured in relation to the upper and lower surfaces of the airfoil.

10. The combination as defined in claim 9, the first securing means including plates within the access cavities presented against the spanwise walls and bolts extending therefrom to the airfoil-attachment portion of the retention member, the second securing means including plates presented against the upper and lower airfoil surfaces and bolts extending therefrom to the airfoil-attachment portion of the retention member.

References Cited in the file of this patent
UNITED STATES PATENTS

| | | |
|---|---|---|
| 1,789,240 | Leitner | Jan. 13, 1931 |
| 1,999,136 | De La Cierva | Apr. 23, 1935 |
| 2,056,592 | Siddeley | Oct. 6, 1936 |
| 2,067,228 | Bennett | Jan. 12, 1937 |
| 2,152,861 | Bennett | Apr. 4, 1939 |
| 2,273,919 | Allward | Feb. 24, 1942 |
| 2,589,193 | Mayne | Mar. 11, 1952 |